United States Patent
Ramachandran et al.

(10) Patent No.: US 9,392,514 B2
(45) Date of Patent: Jul. 12, 2016

(54) METHODS AND APPARATUS FOR MANAGING MOBILITY IN A MULTI-RADIO DEVICE

(71) Applicant: QUALCOMM Incorporated, San Diego, CA (US)

(72) Inventors: Shyamal Ramachandran, San Diego, CA (US); Thomas Klingenbrunn, San Diego, CA (US); Aziz Gholmieh, Del Mar, CA (US); Amit Mahajan, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/812,421

(22) Filed: Jul. 29, 2015

(65) Prior Publication Data
US 2015/0334617 A1 Nov. 19, 2015

Related U.S. Application Data

(62) Division of application No. 13/752,561, filed on Jan. 29, 2013, now Pat. No. 9,131,416.

(60) Provisional application No. 61/594,318, filed on Feb. 2, 2012.

(51) Int. Cl.
*H04W 36/00* (2009.01)
*H04W 72/00* (2009.01)
*H04W 4/00* (2009.01)
*H04W 36/06* (2009.01)
*H04W 36/24* (2009.01)

(52) U.S. Cl.
CPC ............ *H04W 36/06* (2013.01); *H04W 36/245* (2013.01)

(58) Field of Classification Search
None
See application file for complete search history.

(56) References Cited

U.S. PATENT DOCUMENTS

| 6,978,138 B2 | 12/2005 | Japenga et al. |
| 7,483,702 B2 | 1/2009 | Yeo et al. |
| 2003/0125073 A1 | 7/2003 | Tsai et al. |
| 2007/0037577 A1 | 2/2007 | Dalsgaard et al. |

(Continued)

FOREIGN PATENT DOCUMENTS

| WO | WO-2011123581 A1 | 10/2011 |
| WO | WO-2012021879 A2 | 2/2012 |
| WO | WO-2012093901 A2 | 7/2012 |

OTHER PUBLICATIONS

International Search Report and Written Opinion—PCT/US2013/023754—ISA/EPO—Jun. 11, 2013.

(Continued)

*Primary Examiner* — Erika Washington
(74) *Attorney, Agent, or Firm* — Patterson & Sheridan, L.L.P.

(57) ABSTRACT

Methods, apparatus, and computer program products for managing mobility in a multi-radio device are provided. One example method generally includes detecting that a first channel is not usable for communicating via a first radio access technology (RAT); receiving a message to redirect from a second channel to the first channel; determining the first channel is in a set of one or more blocked channels not usable for the first RAT; and in response to the determination, taking one or more actions. Another example method generally includes detecting that a first channel is not usable for communicating via a first RAT and providing an indication to a network that a user equipment (UE) no longer supports the first channel.

22 Claims, 9 Drawing Sheets

(56) References Cited

U.S. PATENT DOCUMENTS

| | | |
|---|---|---|
| 2007/0183427 A1 | 8/2007 | Nylander et al. |
| 2009/0252122 A1 | 10/2009 | Leinonen et al. |
| 2010/0151869 A1 | 6/2010 | Fischer et al. |
| 2011/0019104 A1* | 1/2011 | Kwak .................. H04W 16/14 348/731 |
| 2011/0122801 A1 | 5/2011 | Franklin et al. |
| 2011/0242969 A1 | 10/2011 | Dayal et al. |
| 2012/0113906 A1 | 5/2012 | Kadous et al. |
| 2013/0072209 A1 | 3/2013 | Haartsen |
| 2013/0203417 A1 | 8/2013 | Ramachandran et al. |

OTHER PUBLICATIONS

Partial International Search Report—PCT/US2013/023754—ISA/EPO—Aug. 8, 2013.

* cited by examiner

METHODS AND APPARATUS FOR MANAGING MOBILITY IN A MULTI-RADIO DEVICE

CROSS-REFERENCE TO RELATED APPLICATIONS

This application is a divisional of U.S. patent application Ser. No. 13/752,561, filed Jan. 29, 2013, issued as U.S. Pat. No. 9,131,416 on Sep. 8, 2015 and entitled "Methods and Apparatus for Managing Mobility in a Multi-Radio Device," which claims benefit of U.S. Provisional Patent Application Ser. No. 61/594,318, filed Feb. 2, 2012 and entitled "Methods and Apparatus for Managing Mobility in a Multi-Radio Device," each of which is herein incorporated by reference.

BACKGROUND

1. Field

Certain aspects of the present disclosure generally relate to wireless communications and, more particularly, to managing mobility in multi-radio devices.

2. Background

Wireless communication networks are widely deployed to provide various communication content such as voice, video, packet data, messaging, broadcast data, and the like. These wireless networks may be multiple-access networks capable of supporting multiple users by sharing the available network resources. Examples of such multiple-access networks include code division multiple access (CDMA) networks, time division multiple access (TDMA) networks, frequency division multiple access (FDMA) networks, orthogonal FDMA (OFDMA) networks, and single-carrier FDMA (SC-FDMA) networks.

Certain techniques have been designed to provide wireless device operational modes that comply with requirements established for operations on certain frequency bands of radio access networks (RANs). One such technique involves a wireless device receiving voice service from a legacy network (e.g., a 1× radio transmission technology 1×RTT, or simply "1×," network) which provides service that geographically overlaps the service of an enhanced network. When not engaged in a voice call, the device tunes to the enhanced network to obtain non-voice data services, and monitors for paging transmissions signaling a forthcoming 1× voice call. During voice calls, transmitting and receiving is suspended on the enhanced network. Thus, a limitation of this technique is that a UE may not simultaneously handle 1× voice sessions and non-voice data sessions.

Some devices may be capable of simultaneously communicating over multiple RANs. These devices may be able to avoid many of the limitations imposed by having to tune one receiver to various networks. However, in some cases a mobile service operator may prohibit the device from simultaneous communications in certain network frequency bands.

SUMMARY

Certain aspects of the present disclosure generally relate to a multi-radio user equipment (UE) handling network-triggered mobility from a channel that is not locally barred to a locally barred channel.

Certain aspects of the present disclosure provide a method for wireless communications by a UE. The method generally includes detecting that a first channel is not usable for communicating via a first radio access technology (RAT); receiving a message to redirect from a second channel to the first channel; determining that the first channel is in a set of one or more blocked channels not usable for the first RAT; and, in response to the determination, taking one or more actions.

Certain aspects of the present disclosure provide a method for wireless communications by a UE. The method generally includes detecting that a first channel is not usable for communicating via a first RAT and providing an indication to a network that the UE no longer supports the first channel. For certain aspects, the method includes transitioning to communicating on a second channel before providing the indication.

Certain aspects of the present disclosure provide an apparatus for wireless communications. The apparatus generally includes a receiver and a processing system. The processing system is typically configured to detect that a first channel is not usable for communicating via a first RAT, wherein the receiver is configured to receive a message to redirect from a second channel to the first channel; to determine the first channel is in a set of one or more blocked channels not usable for the first RAT; and to take one or more actions in response to the determination. In some aspects, the apparatus may include a transmitter.

Certain aspects of the present disclosure provide an apparatus for wireless communications. The apparatus generally includes a processing system configured to detect that a first channel is not usable for communicating via a first RAT and a transmitter configured to provide an indication to a network that the apparatus no longer supports the first channel. In some aspects, the apparatus may include a receiver.

Certain aspects of the present disclosure provide an apparatus for wireless communications. The apparatus generally includes means for detecting that a first channel is not usable for communicating via a first RAT; means for receiving a message to redirect from a second channel to the first channel; means for determining the first channel is in a set of one or more blocked channels not usable for the first RAT; and means for taking one or more actions in response to the determination.

Certain aspects of the present disclosure provide an apparatus for wireless communications. The apparatus generally comprises means for detecting that a first channel is not usable for communicating via a first RAT and means for providing an indication to a network that the apparatus no longer supports the first channel.

Certain aspects of the present disclosure provide a computer program product for wireless communications by a UE. The computer program product generally includes a computer-readable medium having instructions executable for detecting that a first channel is not usable for communicating via a first RAT; for receiving a message to redirect from a second channel to the first channel; for determining the first channel is in a set of one or more blocked channels not usable for the first RAT; and for taking one or more actions in response to the determination.

Certain aspects of the present disclosure provide a computer program product for wireless communications by a UE. The computer program product generally includes a computer-readable medium having instructions executable for detecting that a first channel is not usable for communicating via a first RAT and for providing an indication to a network that the UE no longer supports the first channel.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The techniques described herein may be used for various wireless communication networks such as code division multiple access (CDMA), time division multiple access (TDMA), frequency division multiple access (FDMA), orthogonal FDMA (OFDMA), single carrier FDMA (SC-FDMA) and other networks. The terms "network" and "system" are often used interchangeably. A CDMA network may implement a radio access technology (RAT) such as universal terrestrial radio access (UTRA), cdma2000, etc. UTRA includes wideband CDMA (WCDMA) and other variants of CDMA. cdma2000 covers IS-2000, IS-95 and IS-856 standards. IS-2000 is also referred to as 1x radio transmission technology (1xRTT), CDMA2000 1x, etc. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP long-term evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and RATs mentioned above as well as other wireless networks and RATs. For clarity, certain aspects of the techniques are described below for LTE and 1xRTT.

Figure 1:
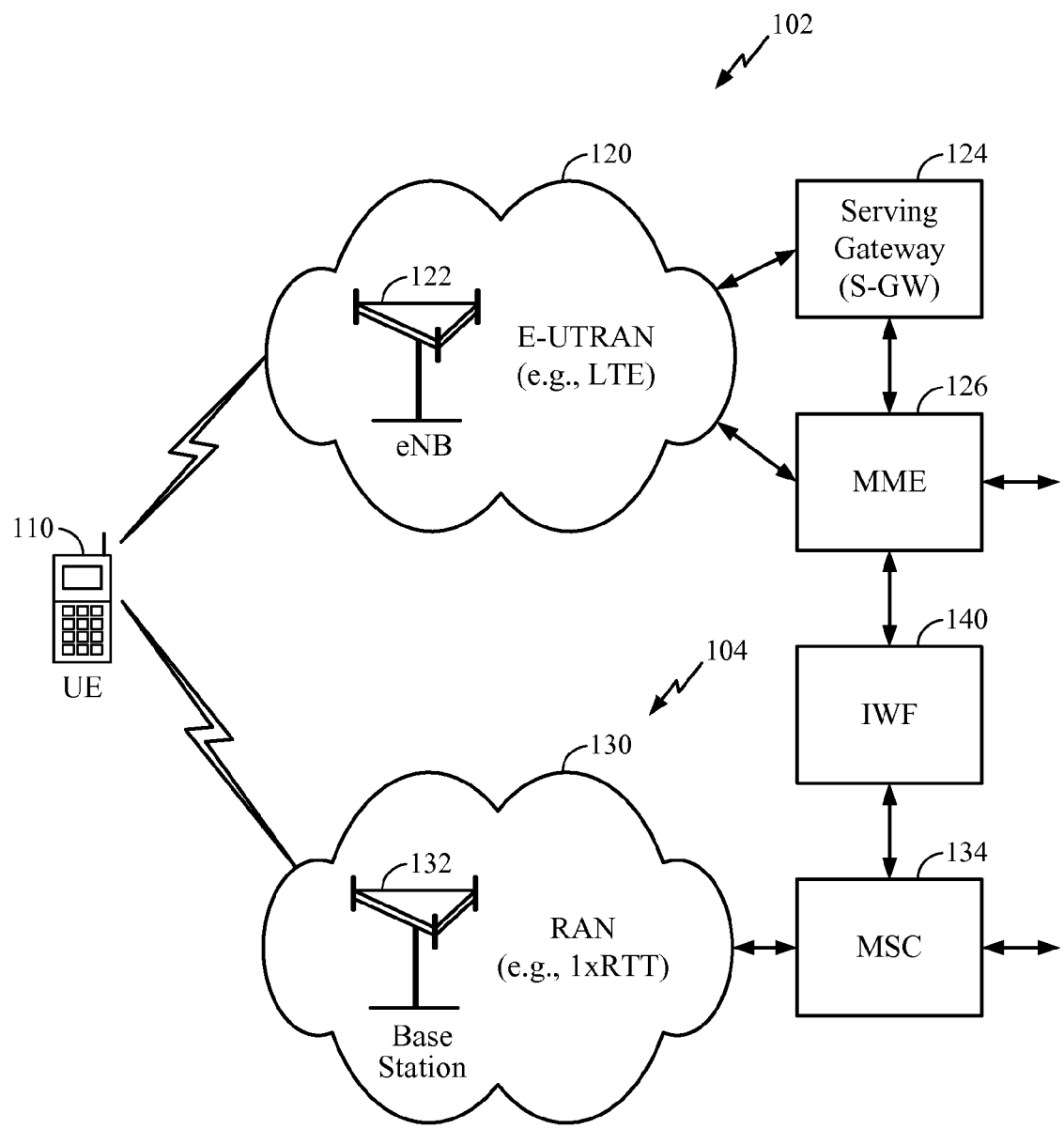
FIG. 1 illustrates a user equipment (UE) communicating with two different radio access networks (RANs) having at least partially overlapping coverage, in accordance with aspects of the present disclosure.

FIG. 1 shows an exemplary deployment in which multiple wireless networks have at least partially overlapping coverage for communicating with a user equipment (UE) 110. An evolved universal terrestrial radio access network (E-UTRAN) 120 may support LTE and may include a number of evolved Node Bs (eNBs) 122 and other network entities that can support wireless communication for user equipment devices (UEs). Each eNB may provide communication coverage for a particular geographic area. The term "cell" can refer to a coverage area of an eNB and/or an eNB subsystem serving this coverage area. A serving gateway (S-GW) 124 may communicate with the E-UTRAN 120 and may perform various functions such as packet routing and forwarding, mobility anchoring, packet buffering, initiation of network-triggered services, etc. A mobility management entity (MME) 126 may communicate with E-UTRAN 120 and serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

A radio access network (RAN) 130 may support 1xRTT and may include a number of base stations 132 and other network entities that can support wireless communication for UEs. A mobile switching center (MSC) 134 may communicate with the RAN 130 and may support voice services, provide routing for circuit-switched calls, and perform mobility management for UEs located within the area served by MSC 134. An inter-working function (IWF) 140 may facilitate communication between MME 126 and MSC 134. The network entities in 1xRTT are described in publicly available documents from 3GPP2.

E-UTRAN 120, serving gateway 124, and MME 126 may be part of an LTE network 102. RAN 130 and MSC 134 may be part of a 1xRTT network 104. For simplicity, FIG. 1 shows only some network entities in the LTE network and the 1xRTT network. The LTE and 1xRTT networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

A UE 110 may be stationary or mobile and may also be referred to as a mobile station (MS), a terminal, an access terminal, a subscriber unit, a station (STA), etc. The UE 110 may be a cellular phone, a personal digital assistant (PDA), a wireless modem, a wireless communication device, a handheld device, a laptop computer, a cordless phone, a wireless local loop (WLL) station, etc.

Upon power up, the UE 110 may search for wireless networks from which it can receive communication services. If more than one wireless network is detected, then a wireless network with the highest priority may be selected to serve the UE 110 and may be referred to as the serving network. The UE 110 may perform registration with the serving network, if necessary. The UE 110 may then operate in a connected mode to actively communicate with the serving network. Alternatively, the UE 110 may operate in an idle mode and camp on the serving network if active communication is not required by the UE 110.

The UE 110 may be located within the coverage of cells of multiple frequencies and/or multiple RATs while in the idle mode. For LTE, the UE 110 may select a frequency and a RAT to camp on based on a priority list. This priority list may include a set of frequencies, a RAT associated with each frequency, and a priority assigned to each frequency. For example, the priority list may include three frequencies X, Y and Z. Frequency X may be used for LTE and may have the highest priority, frequency Y may be used for 1×RTT and may have the lowest priority, and frequency Z may also be used for 1×RTT and may have medium priority. In general, the priority list may include any number of frequencies for any set of RATs and may be specific for the UE location. The UE 110 may be configured to prefer LTE, when available, by defining the priority list with LTE frequencies at the highest priority and with frequencies for other RATs at lower priorities, e.g., as given by the example above.

The UE 110 may operate in the idle mode as follows. The UE 110 may identify all frequencies/RATs on which it is able to find a "suitable" cell in a normal scenario or an "acceptable" cell in an emergency scenario, where "suitable" and "acceptable" are specified in the LTE standards. The UE 110 may then camp on the frequency/RAT with the highest priority among all identified frequencies/RATs. UE 110 may remain camped on this frequency/RAT until either (i) the frequency/RAT is no longer available at a predetermined threshold or (ii) another frequency/RAT with a higher priority reaches this threshold. This operating behavior for the UE 110 in the idle mode is described in 3GPP TS 36.304, entitled "Evolved Universal Terrestrial Radio Access (E-UTRA); User Equipment (UE) procedures in idle mode," which is publicly available.

The UE 110 may be able to receive packet-switched (PS) data services from the LTE network 102 and may camp on the LTE network while in the idle mode. The LTE network 102 may have limited or no support for voice-over-Internet protocol (VoIP), which may often be the case for early deployments of LTE networks. Due to the limited VoIP support, the UE 110 may be transferred to another wireless network of another RAT for voice calls. This transfer may be referred to as circuit-switched (CS) fallback. The UE 110 may be transferred to a RAT that can support voice service such as 1×RTT, WCDMA, GSM, etc. For call origination with CS fallback, the UE 110 may initially become connected to a wireless network of a source RAT (e.g., LTE) that may not support voice service. The UE may originate a voice call with this wireless network and may be transferred through higher-layer signaling to another wireless network of a target RAT that can support the voice call. The higher-layer signaling to transfer the UE to the target RAT may be for various procedures, e.g., connection release with redirection, PS handover, etc.

Figure 2:
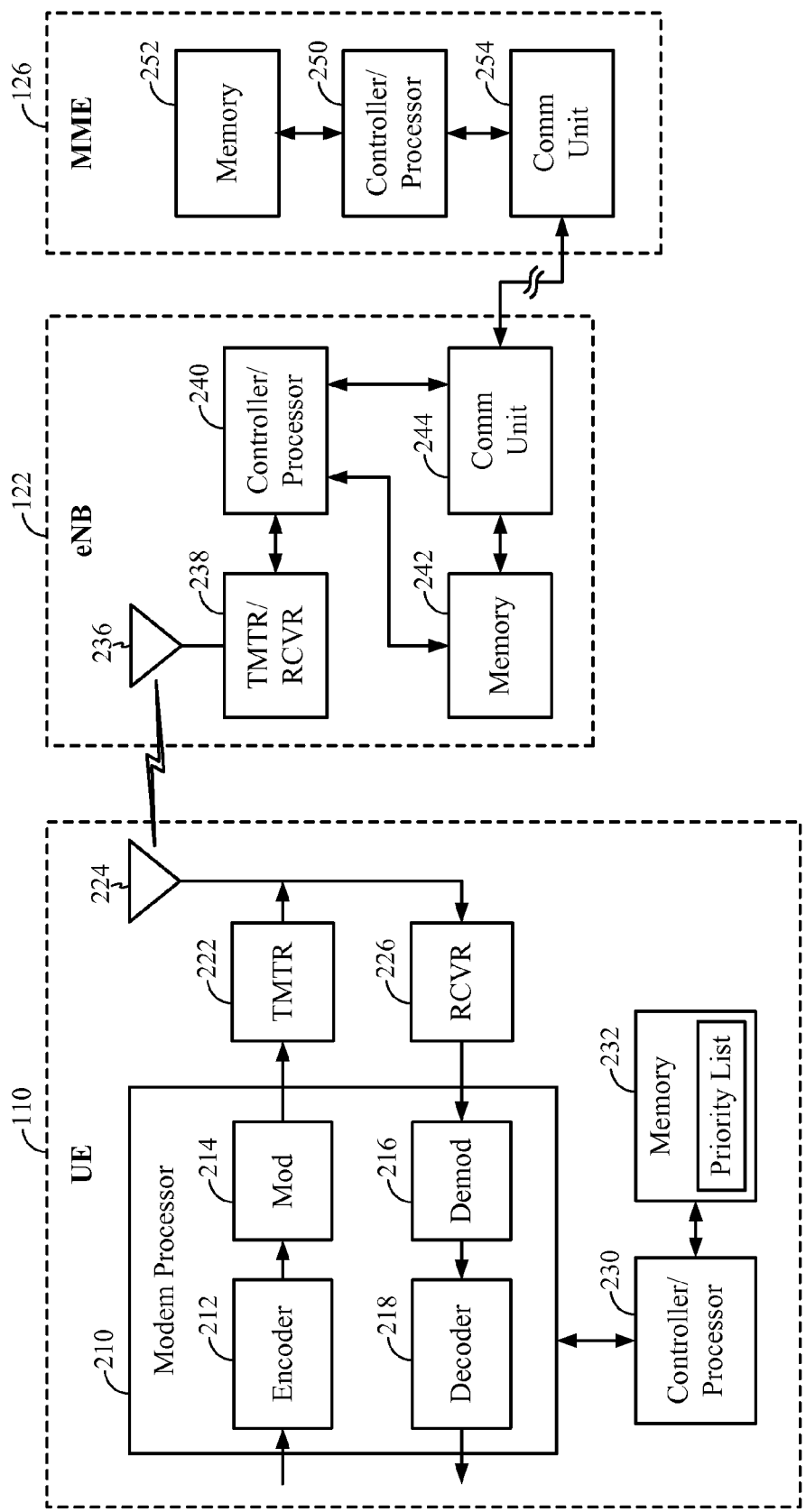
FIG. 2 illustrates an example block diagram for a UE, an evolved Node B (eNB), and a mobility management entity (MME), in accordance with aspects of the present disclosure.

FIG. 2 shows a block diagram of various components of the UE 110, eNB 122, and MME 126 in FIG. 1. At the UE 110, an encoder 212 may receive traffic data and signaling messages to be sent on the uplink. The encoder 212 may process (e.g., format, encode, and interleave) the traffic data and signaling messages. A modulator (Mod) 214 may further process (e.g., symbol map and modulate) the encoded traffic data and signaling messages and provide output samples. A transmitter (TMTR) 222 may condition (e.g., convert to analog, filter, amplify, and frequency upconvert) the output samples and generate an uplink signal, which may be transmitted via an antenna 224 to the eNB 122.

On the downlink, the antenna 224 may receive downlink signals transmitted by the eNB 122 and/or other eNBs/base stations. A receiver (RCVR) 226 may condition (e.g., filter, amplify, frequency downconvert, and digitize) the received signal from the antenna 224 and provide input samples. In accordance with certain aspects of this disclosure, additional receivers may perform similar processes with respect to signals from additional base stations—for example, base stations associated with different, overlapping networks. A demodulator (Demod) 216 may process (e.g., demodulate) the input samples and provide symbol estimates. A decoder 218 may process (e.g., deinterleave and decode) the symbol estimates and provide decoded data and signaling messages received by the UE 110. The encoder 212, modulator 214, demodulator 216, and decoder 218 may be implemented by a modem processor 210. These units may perform processing in accordance with the RAT (e.g., LTE, 1×RTT, etc.) used by the wireless network with which the UE 110 is in communication.

A controller/processor 230 may direct the operation at UE 110. The controller/processor 230 may also perform or direct other processes for the techniques described herein. The controller/processor 230 may also perform or direct the processing by the UE 110 in FIGS. 3 through 7. A memory 232 may store program codes and data for the UE 110. The memory 232 may also store a priority list and configuration information.

At the eNB 122, a transmitter/receiver 238 may support radio communication with the UE 110 and other UEs. A controller/processor 240 may perform various functions for communication with the UEs. On the uplink, the uplink signal from the UE 110 may be received via an antenna 236, conditioned by the receiver 238, and further processed by the controller/processor 240 to recover the traffic data and signaling messages sent by the UE 110. On the downlink, traffic data and signaling messages may be processed by the controller/processor 240 and conditioned by the transmitter 238 to generate a downlink signal, which may be transmitted via the antenna 236 to the UE 110 and other UEs. The controller/processor 240 may also perform or direct other processes for the techniques described herein. The controller/processor 240 may also perform or direct the processing by the eNB 122 in FIGS. 3 through 7. A memory 242 may store program codes and data for the eNB 122. A communication (Comm) unit 244 may support communication with the MME 126 and/or other network entities.

At the MME 126, a controller/processor 250 may perform various functions to support communication services for UEs. The controller/processor 250 may also perform or direct the processing by the MME 126 in FIGS. 3 and 4. A memory 252 may store program codes and data for the MME 126. A communication unit 254 may support communication with other network entities.

FIG. 2 shows simplified designs of the UE 110, eNB 122, and MME 126. In general, each entity may include any number of transmitters, receivers, processors, controllers, memories, communication units, etc. Other network entities may also be implemented in a similar manner.

The techniques presented herein may be considered improvements or optimizations to address inherent limitations in existing procedures (e.g., traditional 1× circuit-switched fall back (1×CSFB)) that can increase call setup delay. In some cases, however, techniques that may be considered new procedures are presented.

In one scenario, a multi-mode UE may register with multiple RAT networks (e.g., 1×RTT & LTE) by performing signaling over the native RAT networks. The UE may then listen for pages in one RAN (e.g., 1× pages) while receiving services (but idle) in the other RAN. The separate receivers may also allow the UE to listen for pages in one RAN while receiving data traffic in another RAN.

In some cases, when receiving a 1× page, a UE may send a message (e.g., an extended service request (ESR) message) to request release of the UE context in the LTE network. In effect, the ESR may cause the LTE network to suspend data transmission to the UE while it is in a call. This may be helpful to prevent the LTE network from attempting to page the UE while it is processing a mobile originated (MO) or mobile terminated (MT) voice call, a short messaging service (SMS) message, or 1× registration.

One of the main reasons to send an ESR, thus, may be to suspend the UE context on LTE when the UE is on a 1× voice call. Hence, if there is incoming LTE data during this time, the LTE network will not waste resources by paging the UE. When the UE completes the process (e.g., the call terminates), the UE may send a tracking area update to the LTE network to resume data services.

How the network responds to this ESR message may depend on how the network is configured. In some cases, more current or "updated" networks may be able to interpret ESR messages to help reduce call setup delay as presented herein. Even in cases where a network simply supports "traditional" 1×CSFB, the techniques presented herein may be applied to help reduce call setup delay.

Managing Mobility in a Multi-Radio Device

Dual-radio devices pose challenges related to trying to simultaneously communicate in different networks. For example, whenever the UE deems that activity on one of the radios prohibits or degrades communication on specific bands/channels on another radio, the UE may most likely take action to ensure that communication is not initiated on such bands/channels. In addition, the UE should ensure proper handling of mobility from other bands/channels where communication will not be degraded to bands/channels where communication will be degraded.

The following discussion relates to operations of an example dual-radio UE supporting 1×RTT and LTE RATs. This is simply an example for illustration purposes. Aspects of the present disclosure may be applied to other RAT combinations, as well. For example, the techniques may be applied in order to address simultaneous operations in LTE Band 4 (B4) and 1× BC1. In this scenario, global positioning system (GPS) operation on the UE might be impacted, and/or the GPS operation might impact the LTE channel. In order to avoid this impact on GPS, LTE may be power limited. A different solution may involve barring the LTE channel in B4. In this case, LTE may be moved to another channel that does not impact GPS.

Figure 3:
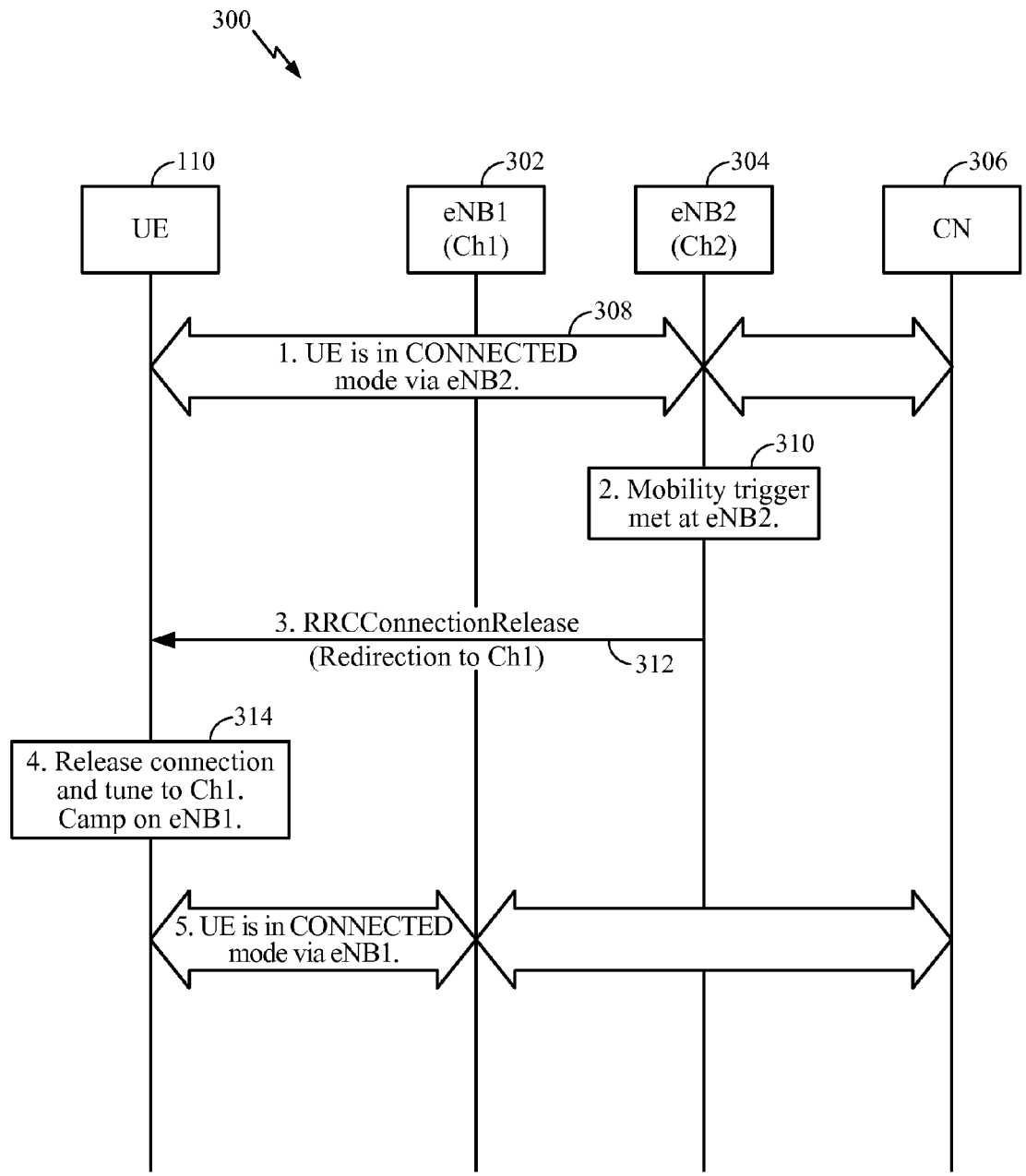
FIG. 3 illustrates a prior art exchange between a UE and two eNBs during a redirection procedure.

FIG. 3 illustrates a conventional exchange 300 between a UE 110 and two eNBs 302, 304 during a redirection procedure for a scenario in which the UE is simultaneously camped on 1×RTT and LTE B4, for example. Providing service coverage for a central network (CN) 306 (e.g., E-UTRAN 120), the eNBs 302, 304 may be similar to the eNB 122 described above with respect to FIGS. 1 and 2. When the user initiates a 1×RTT call (e.g., via a base station 132 not shown in FIG. 3), communication on LTE B4 may be degraded.

According to certain aspects of the present disclosure, if the UE 110 is being served by eNB1 302 on channel 1 (Ch1), the UE may locally bar access on LTE B4, by blocking the serving channel (Ch1) on this band for a configurable period. The UE 110 thereafter looks for other possible bands, channels, and/or RATs on which to communicate while the 1×RTT radio is engaged in a call. For example, the UE may connect to eNB2 304 and operate in connected mode on channel 2 (Ch2) at 308. If the communication signal strength between eNB2 and the UE is weak (e.g., due to distance, interference, etc.), the mobility trigger for eNB2 may be met at 310, and the UE may be redirected to another channel (e.g., by receipt of a Radio Resource Control (RRC) Connection Release message 312 from eNB2). If the UE is redirected to Ch1, which is no longer being locally barred by the UE, then the UE may release the connection to eNB2 and tune to Ch1 at 314 in an effort to connect with eNB1 again, as shown in FIG. 3.

However, in the event that the UE 110 is redirected to a blocked channel (e.g., Ch1 is still locally barred), the UE may attempt to find service on an unaffected LTE band that has not been barred. Unfortunately, without knowledge of what channels are barred, the LTE network may simply redirect the UE back to the barred channel. Accordingly, what is further needed are techniques and apparatus that may help a UE handle network-triggered mobility from a channel that is not barred to a barred channel and may prevent a UE from being repeatedly redirected to a barred channel.

FIGS. 4-7 illustrate example exchanges between a UE 110 and two eNBs 302, 304, in accordance with various aspects of the present disclosure. In all these example exchanges (beginning with the exchange 400 of FIG. 4), the UE 110 may be involved in communication with a first RAT (e.g., a 1×RTT voice call) at 402. This may interfere with, degrade, or otherwise impact communication on the other radio(s) in the multi-radio UE, such that the radio may not be able to communicate with an eNB using a second RAT (e.g., LTE). As an example for the purpose of illustration, Random Access Channels (RACHs) may fail to reach the eNB1 302 on Ch1 at 404. Therefore, the UE 110 may detect that Ch1 is no longer usable (e.g., due to the fact that the UE is involved in a 1×RTT call) and may locally bar Ch1 for a configurable period, for example, at 406. This locally barred channel may be added to a locally stored list or set of blocked channels maintained by the UE. At 408, the UE 110 may search for service on different bands, channels, and/or RATs and may find service (and possibly camp) on a different (unblocked) channel in the second RAT (e.g., Ch2 with eNB2 304) at 410.

Figure 4:
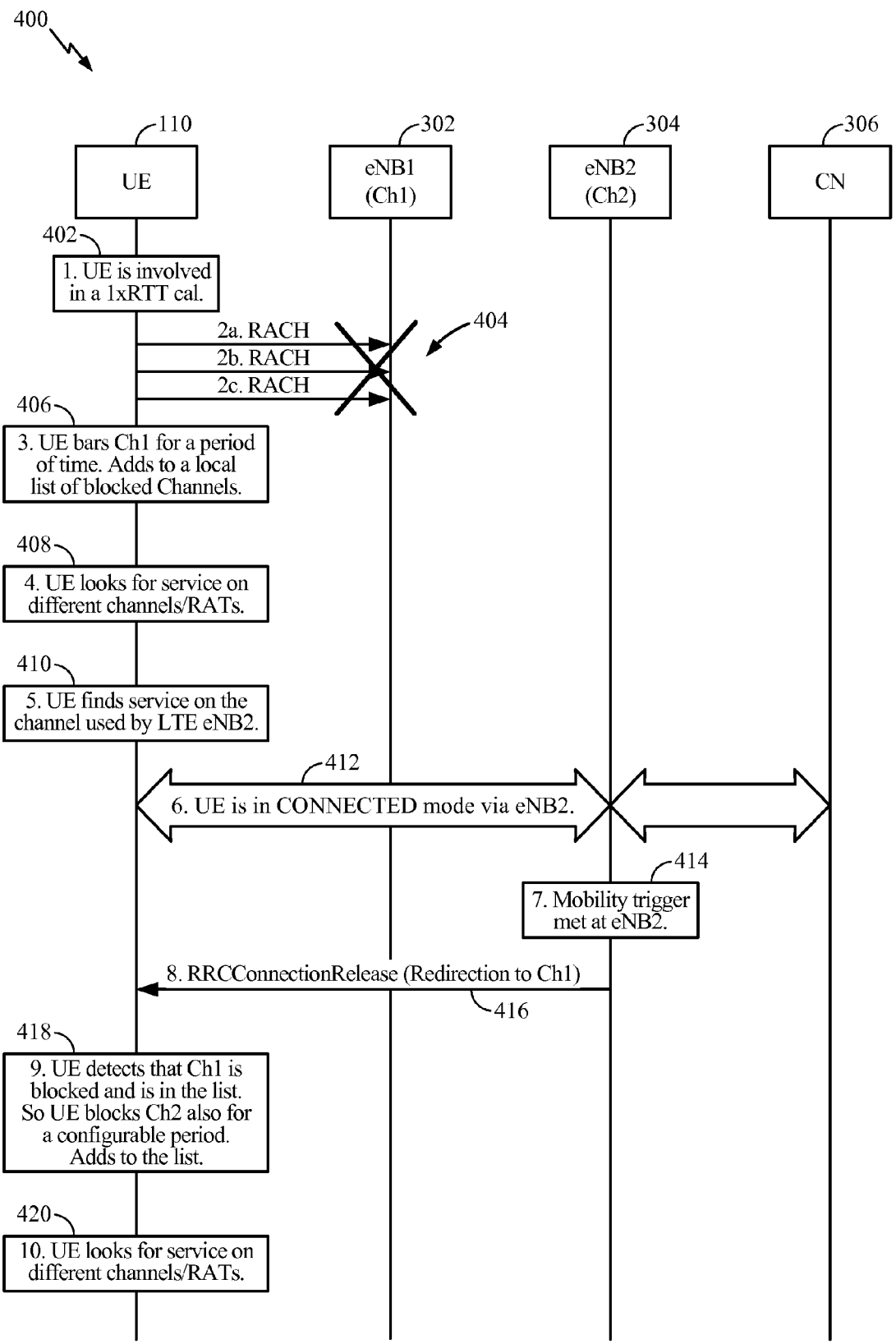
FIG. 4 illustrates an example exchange between a UE and two eNBs, in which the UE locally bars Ch2 for a configurable period after receiving a message to redirect to locally barred Ch1, in accordance with aspects of the present disclosure.

In the example exchange 400 of FIG. 4 specifically, the UE 110 may connect to eNB2 and operate in connected mode on Ch2 at 412. If the communication signal strength between eNB2 and the UE is weak (e.g., due to distance, interference, etc.), the mobility trigger for eNB2 may be met at 414, and the UE may be redirected to Ch1 (e.g., by receiving a Radio Resource Control (RRC) Connection Release message 416 from eNB2). At 418, the UE may detect that Ch1 is on the locally stored list and is therefore blocked, despite the redirection. Therefore, the UE may also block Ch2 for a configurable period, for example, and may add Ch2 to the locally stored list of blocked channels. In this manner, a single redirection to a locally barred channel (Ch1) results in barring the source channel (Ch2), as well. Although not shown, once the configurable time has expired for a given blocked channel, the UE may remove this previously blocked channel from the locally stored list. At 420, the UE may again look for service on different bands, channels, and/or RATs.

Figure 5:
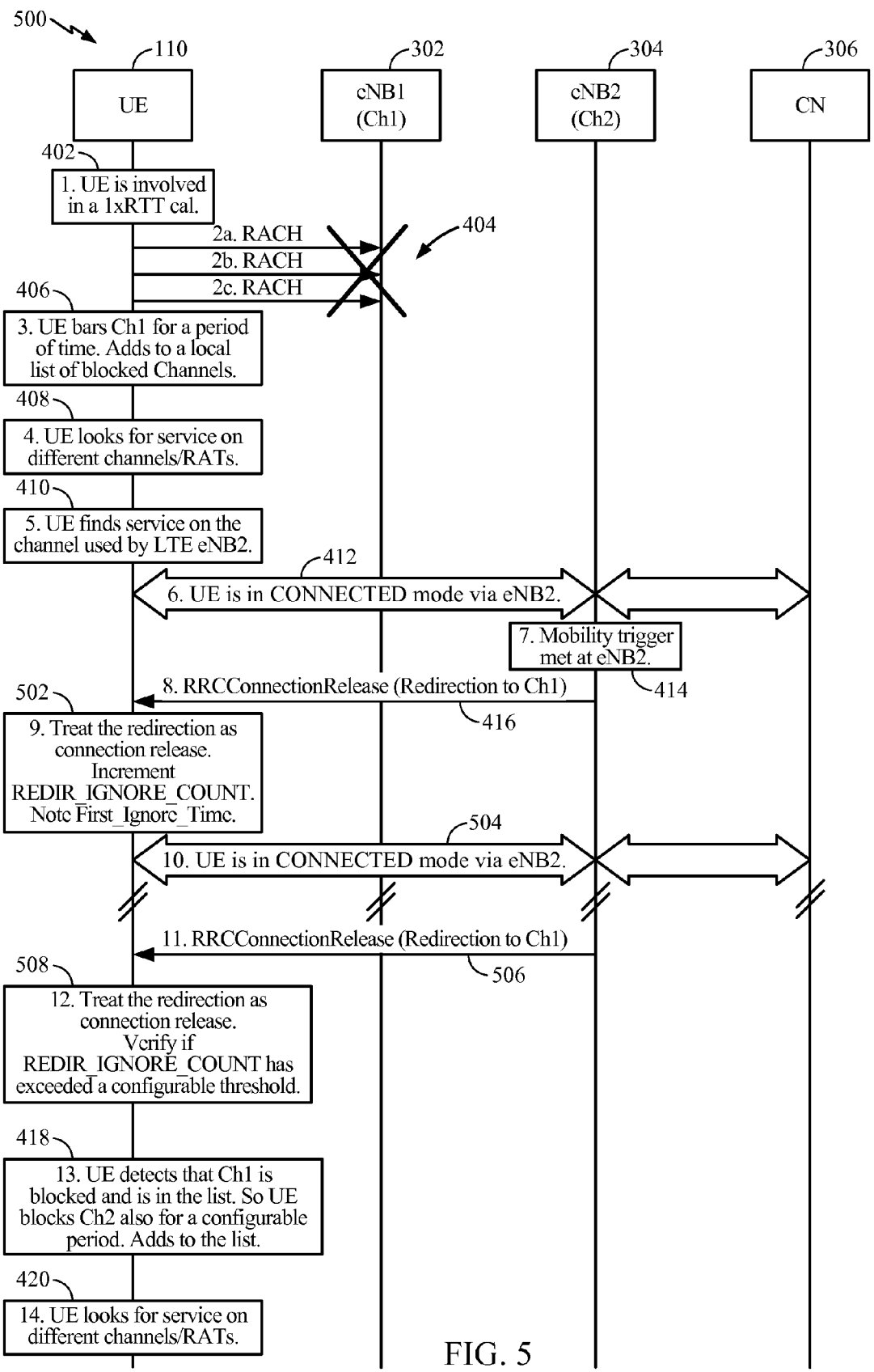
FIG. 5 illustrates an example exchange between a UE and two eNBs, in which the UE locally bars Ch2 for a configurable period after receiving a predetermined number of messages to redirect to locally barred Ch1 within a predetermined interval, in accordance with aspects of the present disclosure.

The example exchange 500 shown in FIG. 5 is similar to that described above with respect to FIG. 4. In this example, however, the UE 110 does not bar Ch2 upon the first redirection to Ch1. In other words, the UE does not bar the source channel in response to receiving the redirection instruction (e.g., the RRC Connection Release message 416). Instead, the UE treats the redirection as a connection release command (e.g., without redirection) at 502.

After a certain number of redirections, the UE may finally add Ch2 to the list of blocked channels. For certain aspects, the UE may increment a counter (e.g., REDIR_IGNORE_COUNT) to count the number of such redirections and/or may note the time the first such redirection was triggered (e.g., the time the redirection instruction was received) as shown at 502. Subsequent connections to eNB2 may be attempted on Ch2 itself, and the UE may operate in connected mode on Ch2 at 504.

If the network continues to redirect the UE to Ch1 (e.g., by sending another RRC Connection Release message 506) and the counter meets or exceeds a predetermined threshold value (which may be fixed for all countings or variable for each counting), as shown at 508, then the UE may once again treat the redirection as a connection release, but this time may also locally bar Ch2 at 418, as described above. In some cases, the counter may increment only if redirections occur within a predetermined interval since a previous such redirection (e.g., from the first redirection). In other words, the counter may be reset if some period has elapsed with no such redirections. In this manner, multiple redirections to a locally barred channel (Ch1) that meet or exceed the threshold result in barring the source channel (Ch2), as well.

Figure 6:
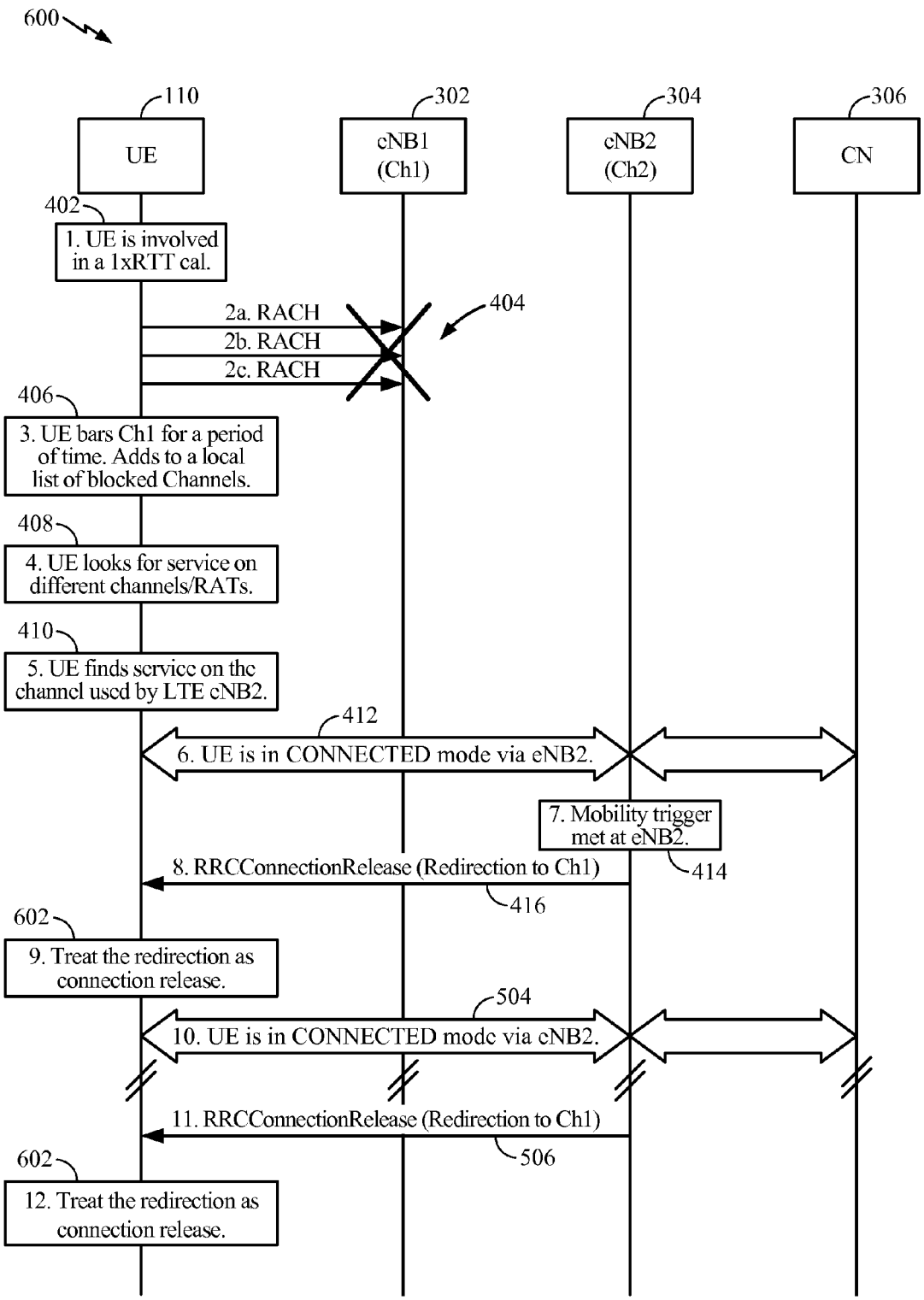
FIG. 6 illustrates an example exchange between a UE and two eNBs, in which the UE ignores messages to redirect to locally barred Ch1, in accordance with aspects of the present disclosure.

In the example exchange 600 shown in FIG. 6, the UE 110 continues to ignore network redirections from Ch2 to Ch1. In this example, all such redirections are treated as connection release commands (e.g., without redirection) at 602, and the UE may continue to establish subsequent connections on Ch2 itself (thereby operating in connected mode on Ch2 at 504). Once the UE has cleared Ch1 (e.g., by terminating a 1×RTT call that caused the blocking of Ch1), the UE may start obeying redirections (e.g., treating redirections as connection release commands with redirection) from Ch2 to Ch1.

This exchange 600 may be understood as a special case of the example exchange 500 of FIG. 5, except the threshold value is infinity. Similarly, the example exchange 400 of FIG. 4 may be understood as a special case of the example exchange 500 of FIG. 5, where the threshold value is 1 (or 0, depending on the whether the redirection count is designed to meet or exceed the threshold value before the source channel is added to the list of blocked channels).

Figure 7:
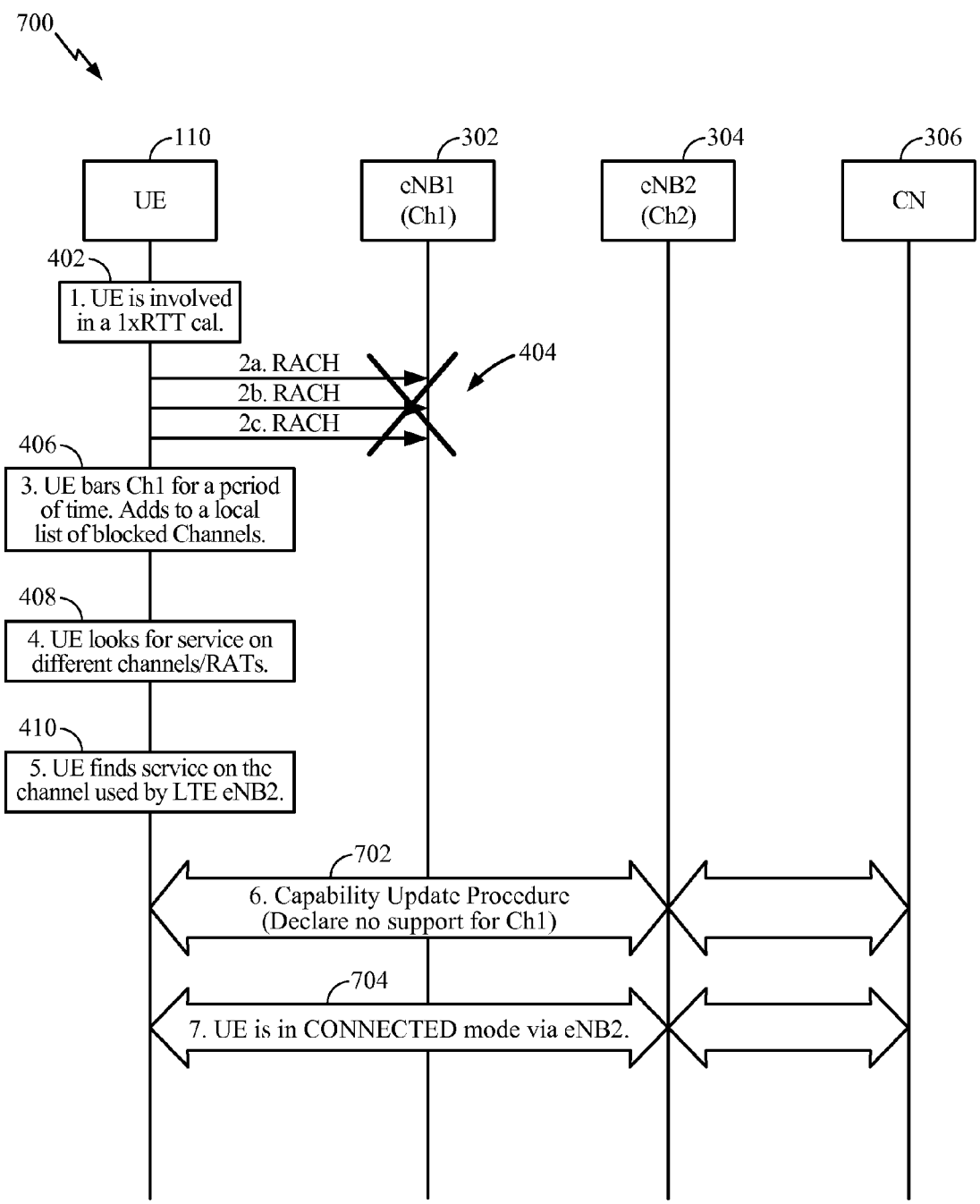
FIG. 7 illustrates an example exchange between a UE and two eNBs, in which the UE informs a network whether Ch1 is locally barred, in accordance with aspects of the present disclosure.

In the example exchange 700 shown in FIG. 7, the UE 110, upon transitioning to Ch2 (e.g., after finding service on Ch2 at 410), may inform the network (e.g., CN 306) that it no longer supports Ch1. This may be accomplished, for example, by the UE triggering a capability update procedure at 702. For example, the UE may cause the network communicating using the second RAT (e.g., LTE) to query the UE 110 about the UE's capabilities via eNB2 before the UE is operating in connected mode with eNB2 on Ch2 at 704. Doing so may ensure that the network will not redirect the UE to Ch1. Once the UE has locally cleared the barring of Ch1, the UE may again commence a capability update procedure with the network to declare that Ch1 is now supported.

It should be noted that a capability update procedure, as defined in certain network-related standards in its current form, is an expensive procedure (e.g., in terms of processing overhead and time). The UE may detach and re-attach in order to update capabilities. This may result in loss of Internet Protocol (IP) continuity at the application layer and might adversely impact certain applications.

Figure 8:
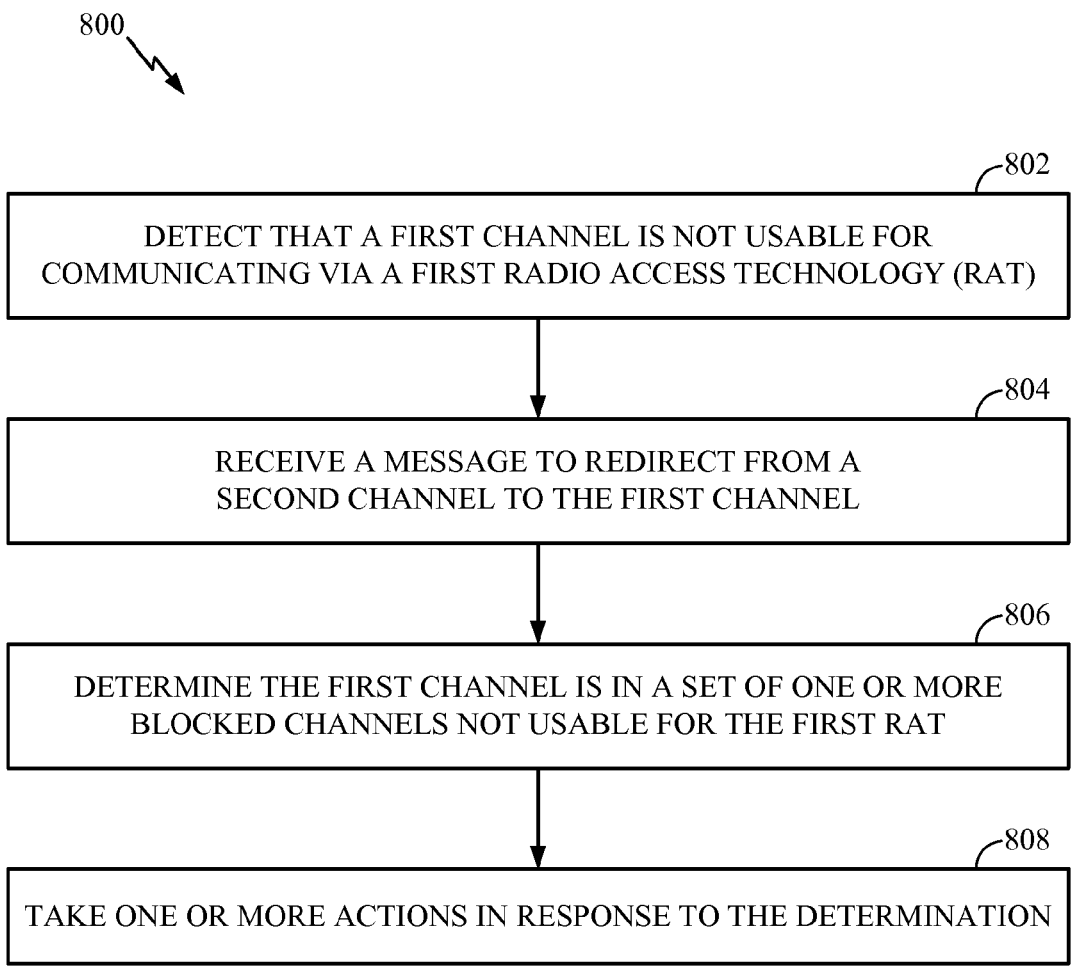
FIG. 8 illustrates example operations, which may be performed by a UE, for handling a determination that a first channel is an unusable channel after being instructed to redirect from a second channel to the unusable first channel, in accordance with aspects of the present disclosure.

FIG. 8 illustrates example operations 800 for handling a determination that a first channel is an unusable channel after being instructed to redirect from a second channel to the unusable first channel, in accordance with certain aspects of the present disclosure. The operations 800 may be performed by a UE, for example. The UE may be capable of communicating via at least two RATs (e.g., a first RAT and a second RAT).

The operations may begin, at 802, with the UE detecting that a first channel is not usable for communicating via a first RAT, such as LTE. For example, the UE may determine a flag (e.g., a locally stored flag) is set, indicating that the first channel is not usable for communicating via the first RAT. The flag may be set based on knowledge of ongoing activity (e.g., presence of a voice call, data reception, critical signaling procedures, or reception of critical messages) via a second RAT, such as 1×RTT. Such a flag may indicate the first channel is not usable for the first RAT because of interfering activity on the first channel in a second RAT (e.g., to which the UE is capable of communicating with). For certain aspects, the UE may detect that the first channel is not usable for communicating via the first RAT after unsuccessfully attempting to access a network using the first RAT on the first channel, as in the uplink RACH failure in steps 2a-2c of FIGS. 4-7. For other aspects, the UE may determine that the first channel is not usable based on a radio link failure (RLF), a system information base (SIB) failure, high blocking rates, and/or low signal-to-noise ratio (SNR), for example.

According to certain aspects, the UE is capable of communicating via a second RAT (e.g., 1×RTT), and the first channel is not usable for communicating via the first RAT because of interfering activity on the first channel due to the second RAT. For other aspects, the first channel may not be usable for communicating via the first RAT because of global positioning system (GPS) activity (or other wireless device activity) on a third channel that can be impacted by or can impact activity of the first channel.

According to certain aspects, the UE may add the first channel to a set (e.g., a locally stored list) of one or more blocked channels. This addition may be performed based on the detection at 802 that the first channel is not usable.

At 804, the UE receives (e.g., via the first RAT) a message to redirect from a second channel to the first channel. For certain aspects, the second channel is used for communicating via a second RAT (e.g., 1×RTT), while in other aspects, the second channel is used for communicating via the first RAT. In some aspects, the UE may receive a message, via the first RAT, to redirect from a second channel used for communicating via a third RAT (e.g., different from the 1×RTT and LTE RATs shown in FIGS. 4-7) to the first channel. In some aspects, the first channel may correspond to one of an LTE RAT or a third RAT (e.g., different from the 1×RTT and LTE RATs, and the second channel may correspond to a remaining one of the LTE RAT and third RAT.

At 806, the UE determines that the first channel is in a set (e.g., on a list) of one or more blocked channels not usable for the first RAT. At 808, the UE takes one or more actions in response to the determination at 806. For certain aspects, the one or more actions may be designed to avoid actual redirection from the second channel to the first channel.

According to certain aspects, taking the one or more actions includes adding the second channel to the set of one or more blocked channels. For certain aspects, the second channel is maintained in the set of blocked channels for a configurable period. In such aspects, the UE may remove the second channel from the set of blocked channels after the configurable period transpires. For certain aspects, the UE may search for service via at least one of the first RAT on a third channel or via a second RAT.

According to certain aspects, taking the one or more actions includes treating the message to redirect from the second channel to the first channel as a connection release command without redirection. In this case, taking the one or more actions may further include camping on the second channel.

According to certain aspects, the operations 800 further include the UE adding the second channel to the set of blocked channels in response to receiving repeated messages to redirect from the second channel to the first channel. For certain aspects, the UE may add the second channel to the set of blocked channels if a predetermined number of messages to redirect from the second channel to the first channel occurs within a predetermined interval. For certain aspects, the predetermined number of messages is variable for each counting of messages within the predetermined interval.

According to certain aspects, the operations 800 further include the UE removing the first channel from the set of blocked channels. After this removal, the UE may obey a subsequently received message to redirect from the second channel to the first channel.

Figure 9:
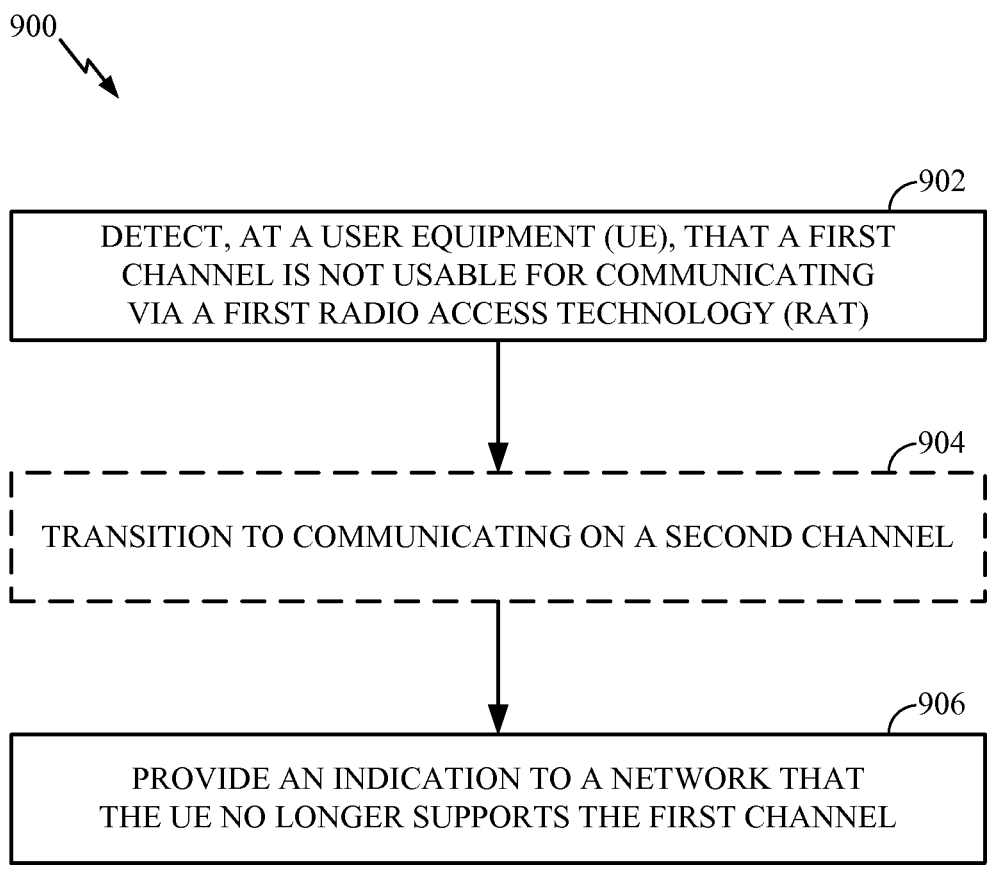
FIG. 9 illustrates example operations for notifying a network that a UE no longer supports an unusable first channel, in accordance with aspects of the present disclosure.

FIG. 9 illustrates example operations 900 for notifying a network that a UE no longer supports an unusable first channel, in accordance with aspects of the present disclosure. The operations 900 may be performed by a UE, for example.

The operations 900 may begin, at 902, with the UE detecting that a first channel is not usable for communicating via a first RAT (e.g., LTE).

At 904, the UE may optionally transition to communicating on a second channel for certain aspects. According to certain aspects, the second channel may be used for communication via the first RAT. For other aspects, the second channel may be used by the UE for communicating via a second RAT (e.g., 1×RTT).

At 906, the UE may provide an indication to a network that the UE no longer supports the first channel. The network may support the first RAT or the second RAT. For certain aspects, this indication may be provided on the second channel, whereas for other aspects, this indication may be provided on the first channel or another channel altogether. According to certain aspects, the indication is provided via a capability update. The capability update may cause the network to query the UE about the UE's capabilities.

According to certain aspects, the operations 900 may further include detecting that the first channel is again usable for communicating via the first RAT and providing another indication to the network that the UE supports the first channel. The other indication may be provided via a capability update.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

For example, means for transmitting, means for providing, and/or means for searching may comprise a transmitting unit, such as the transmitter 222 and/or antenna 224 of the UE 110 illustrated in FIG. 2. Means for receiving and/or means for searching may comprise a receiving unit, such as the receiver 226 and/or the antenna 224 of the UE 110 depicted in FIG. 2. Means for detecting, means for taking action, means for adding, means for removing, means for searching, means for obeying, means for transitioning, means for determining, and/or means for processing may comprise or compose a processing system, which may include one or more processors, such as the controller/processor 230 and/or the modem processor 210 of the UE 110 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover: a, b, c, a-b, a-c, b-c, and a-b-c.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage medium may be any available medium that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blu-ray disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
    detecting that a first channel is not usable for communicating via a first radio access technology (RAT); and
    providing an indication to a network that the UE no longer supports the first channel in response to the detection, wherein the indication is provided via a capability update procedure that causes the network to query the UE about the UE's capabilities.

2. The method of claim 1, further comprising transitioning to communicating on a second channel.

3. The method of claim 2, wherein the indication is provided on the second channel.

4. The method of claim 2, wherein the transitioning comprises transitioning to communicating via the first RAT on the second channel.

5. The method of claim 2, wherein the second channel is used by the UE for communicating via a second RAT.

6. The method of claim 2, wherein the second channel comprises a second band.

7. The method of claim 1, wherein the first RAT comprises long-term evolution (LTE).

8. The method of claim 1, further comprising:
    detecting that the first channel is again usable for communicating via the first RAT; and
    providing another indication to the network that the UE supports the first channel.

9. The method of claim 8, wherein the other indication is provided via a capability update.

10. The method of claim 1, wherein the first channel comprises a first band.

11. An apparatus for wireless communications, comprising:
    a processing system configured to detect that a first channel is not usable for communicating via a first radio access technology (RAT); and
    a transmitter configured to provide an indication to a network that the apparatus no longer supports the first channel in response to the detection, wherein the indication is provided via a capability update procedure that causes the network to query the apparatus about the apparatus's capabilities.

12. The apparatus of claim 11, wherein the processing system is further configured to transition to communicating on a second channel.

13. The apparatus of claim 12, wherein the indication is provided on the second channel.

14. The apparatus of claim 12, wherein the processing system is configured to transition by transitioning to communicating via the first RAT on the second channel.

15. The apparatus of claim 12, wherein the second channel is used by the apparatus for communicating via a second RAT.

16. The apparatus of claim 12, wherein the second channel comprises a second band.

17. The apparatus of claim 11, wherein the first RAT comprises long-term evolution (LTE).

18. The apparatus of claim 11, wherein the processing system is further configured to detect that the first channel is again usable for communicating via the first RAT and wherein the transmitter is configured to provide another indication to the network that the apparatus supports the first channel.

19. The apparatus of claim 18, wherein the other indication is provided via a capability update.

20. The apparatus of claim 11, wherein the first channel comprises a first band.

21. An apparatus for wireless communications, comprising:
    means for detecting that a first channel is not usable for communicating via a first radio access technology (RAT); and
    means for providing an indication to a network that the apparatus no longer supports the first channel in response to the detection, wherein the indication is provided via a capability update procedure that causes the network to query the apparatus about the apparatus's capabilities.

22. A non-transitory computer-readable medium for wireless communications by a user equipment (UE), the non-transitory computer-readable medium having instructions executable for:
- detecting that a first channel is not usable for communicating via a first radio access technology (RAT); and
- providing an indication to a network that the UE no longer supports the first channel in response to the detection, wherein the indication is provided via a capability update procedure that causes the network to query the UE about the UE's capabilities.

* * * * *